United States Patent [19]

Persson

[11] Patent Number: 5,020,766

[45] Date of Patent: Jun. 4, 1991

[54] SOUND AND VIBRATION DAMPER

[76] Inventor: Elerth Persson, Domarringen 15, S-245 00 Staffanstorp, Sweden

[21] Appl. No.: 328,507

[22] Filed: Mar. 24, 1989

[51] Int. Cl.[5] .......... F16C 55/00

[52] U.S. Cl. .......... 248/559; 248/636

[58] Field of Search .......... 248/559, 636, 638, 562; 188/378–380

[56] References Cited

U.S. PATENT DOCUMENTS

| | | | |
|---|---|---|---|
| 2,628,799 | 2/1953 | Aaby | 248/298 X |
| 3,064,493 | 11/1962 | Popovich et al. | 188/378 X |
| 3,749,339 | 7/1973 | Avedissian | 248/638 X |
| 4,131,225 | 12/1978 | Bauer et al. | 228/161 |
| 4,691,488 | 9/1989 | Tomma | 248/559 X |
| 4,744,749 | 5/1956 | Fiedor | 248/559 X |

FOREIGN PATENT DOCUMENTS

| | | | |
|---|---|---|---|
| 0220709 | 5/1987 | European Pat. Off. . | |
| 2902995 | 9/1980 | Fed. Rep. of Germany . | |
| 1252603 | 8/1986 | Japan | 248/636 |

OTHER PUBLICATIONS

Miller, J. E., "Silencing the Noisy Hydraulic System", Machine Design, Jun. 14, 1973, pp. 138–143.

Noss, J. S., "Can You Hear the Hydraulics Systems?", Machine Design, Sep. 17, 1970, pp. 141–145.

Skaistis et al., "Nine Ways to Hush your Hydraulic System", The Production Engineering Magazine, vol. 22, No. 7, pp. 46–49.

*Primary Examiner*—Alvin C. Chin-Shue

*Attorney, Agent, or Firm*—Cushman, Darby & Cushman

[57] ABSTRACT

A device for damping vibrations, shocks, blows and noise in hydraulic lines. Hydraulic lines with varying pressure or pulsating flow are passed ducts in a heavy block. The ducts in the block have a greater diameter than the hydraulic lines and the ducts are angled inside the blocks.

10 Claims, 1 Drawing Sheet

SOUND AND VIBRATION DAMPER

FIELD OF THE INVENTION

This invention relates to a damper for reducing sound and vibration in hydraulic lines. In particular, this invention relates to damping and sound and vibration in the hydraulic lines of heavy machinery.

BACKGROUND OF THE INVENTION

Increasingly at present, hydraulic power is being used to drive and control heavy machinery such as loaders and digging machines. The use of hydraulic power has considerable advantages in wear, controllability et cetera.

Because heavy machinery is becoming large, larger and larger hydraulic drive pumps are now required. For example, cog-wheel pumps are used because they are fabricated at low cost relative to their large capacity. Cog-wheel pumps and other pumps unfortunately, however, do not deliver an absolutely even flow. Pulsations, vibrations, shocks and even blows occur. Blows are particularly prevalent when very high pressures are used. The resulting vibration and noise are disturbing for the driver, disturbing for the environment, and increase strain on the machine.

A possible way to solve this problem is to provide pulsation equalizers. Pulsation equalizers which can handle very high hydraulic pressures are, however, very expensive. The working pressures encountered in heavy machinery can be as high as 200 kp/cm$^2$. In addition, a single piece of heavy machinery may require damping the vibration of two or three pumps. Multiple expensive pulsation equalizers would then be required.

SUMMARY OF THE INVENTION

In view of the above problem, it is an object of this invention to provide a simple apparatus for eliminating vibrations and blows in a hydraulic system.

The present invention solves the problem by connecting one or more hydraulic pipes the vibrations in which are to be damped, to a duct in a heavy mass. The mass may involve a large cast iron block in which a number of holes or ducts have been bored. As is apparent, this is a comparatively low cost solution even if the block weighs several tens of kilograms. The cost will be a mere fraction of the cost of using multiple conventional pressure and vibrational equalizers.

In operation, the present invention damps vibration and sound surprisingly well. Although the actual mechanism by which this improved damping occurs is not well understood at the time of this writing, the improved damping has been confirmed practical experiments.

The invention is, of course, not appliable in all cases where hydraulic pumps and engine are used. This invention is to be used in connection with heavy machinery and as stationary hydraulic equipment. The invention should be used with machinery to which a hundred kilograms can be added or removed without affecting the performance of the machine. In some cases, the additional weight of the invention can simultaneously be used as a counter weight on a piece of machinery.

Additional desirable features of the invention are apparent from the following description of the preferred embodiment.

DETAILED DESCRIPTION OF THE PREFERRED EMBODIMENT

Figure 1:
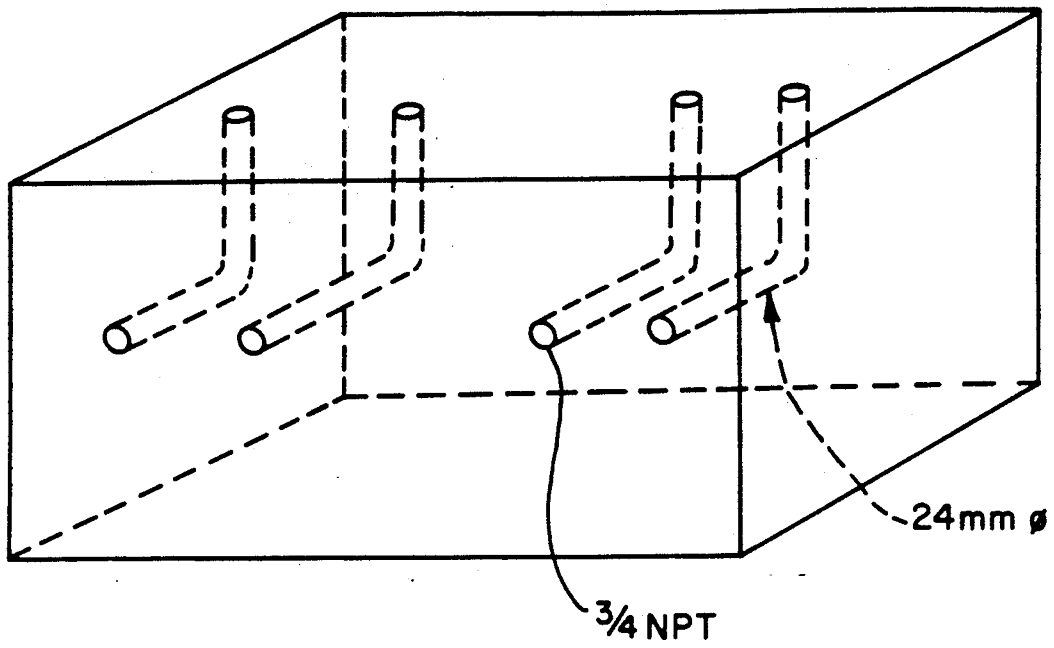
FIG. 1 shows one embodiment of the present invention.

FIG. 1 shows a cast iron block weighing about 130 kilos. Two adjacent longitudinal sides of the block which are angled relative each other each contain holes of a diameter of 24 mm. The holes in each of these two sides are bored so that they meet each other inside the block, thereby forming the shown four right-angled ducts. ¾ inch connections and hydraulic oil lines are then connected to the ducts. The hydraulic lines lead both to and from the driving and controlling means so that both types of lines lead pass through the ducts.

The block such as the one depicted in FIG. 1 was mounted directly in the frame of the digger loader. This loader previously had had a sound level of 90 db in the operator's cab. After the block was installed, the sound level was measured to be 17.6 db. Considerable damping was therefore achieved. For this test, the operator's cab was fastened directly to the frame of the loader.

Damping was also observed with the block lying loosely on the ground. When different ducts were connected to different controlling and driving means, the amount of residual noise and vibration in individual hydraulic lines seemed to be independent of the particular duct to which the lines were connected. The block therefore simultaneously damps out several different vibrations at several different pressure levels. This test demonstrates this block can be used to replace a number of expensive pressure equalizers. Furthermore, the wear resistance of this block is vastly superior to that of pressure equalizers.

Figure 2:
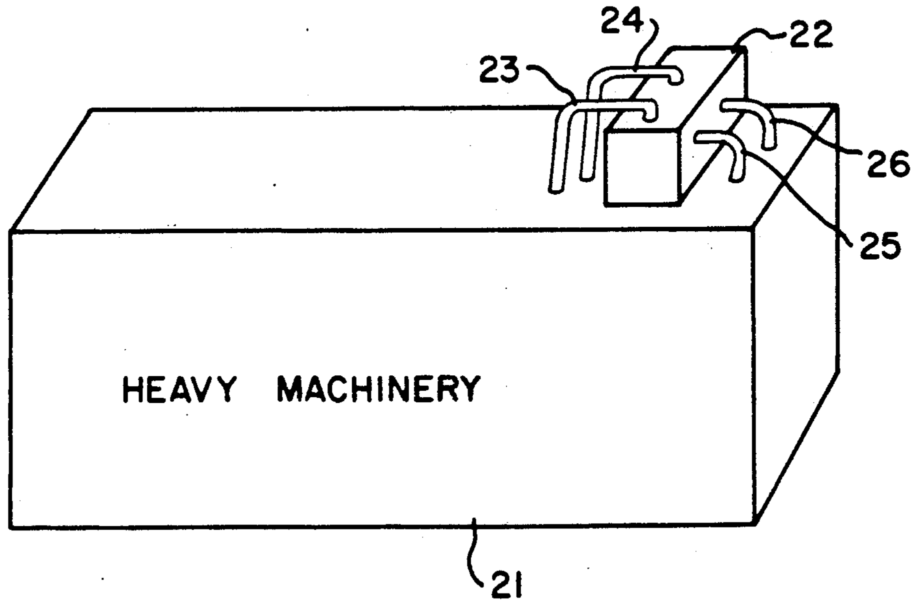
FIG. 2 shows the embodiment of FIG. 1 mounted on a piece of heavy machinery.

In this test, the block was placed in the front end of the loader. FIG. 2 shows the damping block 22 mounted in a non-specific way onto a piece of heavy machinery 21. Hydraulic lines 23, 24, 25 and 26 are shown connected to ducts inside the block. The block may, however, comprise a swinging unit which generates vibrations. These vibrations may that in turn be transmitted to the frame of the machinery in such a way that they annhilate undesirable vibrations generated by the machinery itself.

Preferably, the block is heavy so that its inertia is great in comparison to the hydraulic forces and vibrations to be damped. Furthermore, the material of the block is preferably an unyielding, high density, sound and mentioned function well. It is possible that damping may be further improved by ducts with other angles as well as ducts with greater length. If a material with a lower density is used, good effects may be achieved with larger blocks.

In the embodiment of FIG. 1, only one block is used for all the lines and connections that need to be vocationally damped. It is of course also possible to arrange different blocks at different places on the machine if this is practical. Presumably one is then forced to have comparatively heavy masses for the damping at all places.

The angled ducts in the embodiment are presumably not necessary. Damping is presumably improved, however, when the transfer of vibration from the hydraulic lines to the block is facilitated by means of angles, throttles or expansions. For example, good damping is achieved if a hydraulic branched line is connected to a blind hole in the material. Note in the embodiment of FIG. 1 that the ducts are wider than the connected pipes.

I claim:

1. A noise and vibration damping apparatus comprising:

a piece of heavy machinery having at least one hydraulic line for operating part of said piece of heavy machinery and thereby tending to produce noise and vibration as a result of pressure shocks in said hydraulic line;

means for damping said sound and vibration as apparent at a location on said piece of heavy machinery, comprising a block of unyielding solid material mounted on said piece of heavy machinery between said location and a site where said noise vibration originate;

said block having internal passageway means defining at least one hydraulic fluid duct extending through said block, said duct extending for a first distance in a first direction in said block, then turning at a bend and extending for a second distance in a second direction in said block;

said block being interposed in said hydraulic line, so that said duct forms a respective portion of said hydraulic line;

said hydraulic line being provided with a working pressure which reaches approximately 200 kp/cm$^2$;

said block having a mass of at least several tens of kilograms;

said block, in use, transferring noise and vibration from hydraulic fluid in said hydraulic line to said block, sufficient to reduce sound level at said location by a rate of about 90 db (undamped) to 71.6 (damped).

2. The noise and vibration damping apparatus of claim 1 wherein the hydraulic fluid duct has a diameter and the hydraulic line has a diameter, the diameter of the hydraulic fluid duct being larger than the diameter of the hydraulic line.

3. The noise and vibration damping apparatus of claim 1 wherein the hydraulic fluid duct extends in said second direction from said bend until it exits the block.

4. The noise and vibration damping apparatus of claim 1 wherein the block is made of cast iron.

5. The noise and vibration damping apparatus of claim 1 further comprising additional hydraulic fluid ducts in said block and additional hydraulic lines, each of said additional hydraulic lines being connected to a different one of said additional hydraulic fluid ducts.

6. The noise and vibration damping apparatus of claim 1 wherein the block weighs over 100 kilograms.

7. The noise and vibration damping apparatus of claim 1 wherein each said duct is cylindrical.

8. The noise and vibration damping apparatus of claim 1 wherein the block has a cross-section and a length, the length being measured perpendicular to the plane of the cross-section, the cross-section being a quadrilateral, two adjacent sides of the quadrilateral cross-section each having a hole which extends into the block, these two holes meeting inside the block to form said duct.

9. The noise and vibration damping apparatus of claim 8 wherein the two holes meet inside the block at a right angle.

10. The noise and vibration damping apparatus of claim 8 further comprising additional hydraulic fluid ducts in said block and additional hydraulic lines, each of said additional hydraulic lines being connected to a different one of said additional hydraulic fluid ducts.

* * * * *